US012645900B2

(12) United States Patent
Chang et al.

(10) Patent No.: US 12,645,900 B2
(45) Date of Patent: Jun. 2, 2026

(54) INDUCTIVE FLOOR MAT RECORDING SYSTEM

(71) Applicant: NATIONAL YUNLIN UNIVERSITY OF SCIENCE AND TECHNOLOGY, Douliu City (TW)

(72) Inventors: Chia-Hung Chang, Douliu City (TW); Tung-Ming Koo, Douliu City (TW); Chi-Sen Tai, Douliu City (TW); Huey-Yeh Lin, Douliu City (TW)

(73) Assignee: NATIONAL YUNLIN UNIVERSITY OF SCIENCE AND TECHNOLOGY, Douliu City (TW)

( * ) Notice: Subject to any disclaimer, the term of this patent is extended or adjusted under 35 U.S.C. 154(b) by 58 days.

(21) Appl. No.: 18/406,506

(22) Filed: Jan. 8, 2024

(65) Prior Publication Data
US 2025/0225353 A1     Jul. 10, 2025

(51) Int. Cl.
*G06K 7/10* (2006.01)
*G06K 7/00* (2006.01)

(52) U.S. Cl.
CPC ....... *G06K 7/10415* (2013.01); *G06K 7/0008* (2013.01); *G06K 7/10356* (2013.01)

(58) Field of Classification Search
CPC ............. G06K 7/10415; G06K 7/0008; G06K 7/10356; H04Q 5/22; G08B 13/14; G08B 1/08
USPC ................................................ 340/10.1–10.5
See application file for complete search history.

(56) References Cited

U.S. PATENT DOCUMENTS

| | | | | |
|---|---|---|---|---|
| 6,714,121 B1 * | 3/2004 | Moore | | G08B 13/2462 |
| | | | | 340/8.1 |
| 7,084,769 B2 * | 8/2006 | Bauer | | G06K 7/10178 |
| | | | | 340/10.3 |
| 8,044,804 B1 * | 10/2011 | McReynolds | | G01S 13/04 |
| | | | | 340/8.1 |
| 9,876,536 B1 * | 1/2018 | Bell | | H02J 50/00 |
| 10,121,030 B1 * | 11/2018 | Fink | | H01Q 21/08 |
| 10,146,970 B2 * | 12/2018 | Yeum | | G01S 13/74 |
| 10,331,995 B2 * | 6/2019 | Pudenz | | G06K 19/07773 |
| 10,904,646 B2 * | 1/2021 | Fitzgerald | | H04W 4/38 |
| 11,620,880 B2 * | 4/2023 | Khojastepour | | G06N 3/04 |
| | | | | 340/5.9 |

(Continued)

FOREIGN PATENT DOCUMENTS

CA          2714534 A1 *  9/2009  ........... G06F 3/0233

*Primary Examiner* — Nam V Nguyen
(74) *Attorney, Agent, or Firm* — MUNCY, GEISSLER, OLDS & LOWE, P.C.

(57) ABSTRACT

An inductive floor mat recording system for reading an RFID tag, includes at least one RFID transceiver device, floor mats and a host. The at least one RFID transceiver device has at least two transceiver antennas, a reading element for reading the RFID tag, a power divider and a wireless transmission element electrically connected to the reading element. The power divider is electrically connected in parallel to the at least two transceiver antennas, and the reading element simultaneously uses the transceiver antennas for reading through the power divider. The floor mats are spliced together, each of the floor mats is provided with at least one transceiver antenna connected to the host through the wireless transmission element to obtain data of the RFID tag read by the reading element by the host.

8 Claims, 8 Drawing Sheets

(56)  References Cited

U.S. PATENT DOCUMENTS

| | | | | |
|---|---|---|---|---|
| 2003/0052783 A1* | 3/2003 | Sitzman | ................. | H01Q 21/08 |
| | | | | 340/572.1 |
| 2006/0202832 A1* | 9/2006 | Reznik | ............... | G06K 7/10346 |
| | | | | 340/539.1 |
| 2013/0135084 A1* | 5/2013 | Chakravarty | ........... | H02J 50/20 |
| | | | | 340/10.1 |

* cited by examiner

INDUCTIVE FLOOR MAT RECORDING SYSTEM

FIELD OF THE INVENTION

The invention relates to inductive floor mats, and more particularly to an inductive floor mat recording system.

BACKGROUND OF THE INVENTION

For competitions such as road running and cycling, hundreds, thousands or even tens of thousands of contestants compete at the same time. In order to quickly and accurately record the finishing times of different contestants, RFID systems are currently used for recording competition results. Please refer to FIG. 1 and FIG. 2 for a conventional inductive floor mat recording system provided with a plurality of inductive antennas 2 disposed at intervals on a long strip of floor mat 1. The inductive antennas 2 are electrically connected in parallel to a reader 3, the reader 3 sequentially reads an RFID tag 4 sensed by the inductive antennas 2 through scanning, and transmits the information of the RFID tag 4 to an external computer 8 in a wired manner via a processor 5 and through an output interface 6 and a connection line 7 to record the information of the RFID tag 4.

In practice, each contestant carries an exclusive RFID tag 4 for the competition, and the at least one floor mat 1 is set up at the starting point and the finishing point. According to the requirements of the competition event, the at least one floor mat 1 can also be set up at designated points along the way. The at least one floor mat 1 is spliced into a long strip. When a contestant passes the floor mat 1 and is sensed by at least one of the inductive antennas 2, the reader 3 of the floor mat 1 reads the RFID tag 4 to obtain information of the RFID tag 4, and the information of the RFID tag 4 together with serial number of the floor mat 1 and the sensing time (passing time) are transmitted to the external computer 8 for storage as the contestant's competition score.

However, in the conventional inductive floor mat recording system, the reader 3 reads the inductive antennas 2 sequentially in a cyclic scanning manner, which results in reading gaps. In other words, the RFID tag 4 sensed by the inductive antennas 2 during the non-scanning time cannot be read by the reader 3. For example, when a contestant carry the exclusive RFID tag 4 passes the floor mat 1 too fast (such as a bicycle race), the RFID tag 4 is often omitted to be read because of a time difference between the cyclic scanning of the reader 3 and the contestants passing the floor mat 1, resulting in no competition results for the contestant.

On the other hand, the conventional reader 3 is transmitted to the external computer 8 in a wired manner and requires an external power supply 9. In actual implementation, power supply and wiring configuration issues need to be considered. When the length of the floor mat 1 is insufficient and splicing is required, it will require more setup time and manpower.

SUMMARY OF THE INVENTION

A main object of the invention is to disclose an inductive floor mat recording system capable of simultaneously using at least two transceiver antennas to read an RFID tag.

In order to achieve the above object, the invention discloses an inductive floor mat recording system for reading an RFID tag, comprising at least one RFID transceiver device, a plurality of floor mats and a host. Each of the RFID transceiver devices has at least two transceiver antennas, a reading element, a power divider, and a wireless transmission element. The transceiver antenna is used to sense the RFID tag, the reading element is used to read the RFID tag, the reading element is electrically connected to the power divider and the wireless transmission element, the power divider is electrically connected in parallel to the at least two transceiver antennas to enable the reading element to use the at least two transceiver antennas for reading at the same time through the power divider.

The floor mats are spliced together, the transceiver antennas, the reading element, the power divider and the wireless transmission element of each of the RFID transceiver devices are respectively disposed on any one of the floor mats, each of the floor mats is provided with at least one of the transceiver antennas, and the reading element, the power divider and the wireless transmission element of the same RFID transceiver device are disposed on the same floor mat. Each of the RFID transceiver devices is wirelessly connected to the host through the wireless transmission element to enable the host to obtain data of the RFID tag read by the reading element.

Accordingly, the invention enables the reading element to electrically connected in parallel to the at least two transceiver antennas through the power divider, so that the reading element is capable of using the at least two transceiver antennas for reading at the same time to solve the problem of the RFID tag not being read caused by reading gaps in the conventional scanning method.

DETAILED DESCRIPTION OF THE PREFERRED EMBODIMENTS

The detailed description and technical content of the invention are described below with reference to the accompanying drawings.

Figure 1:
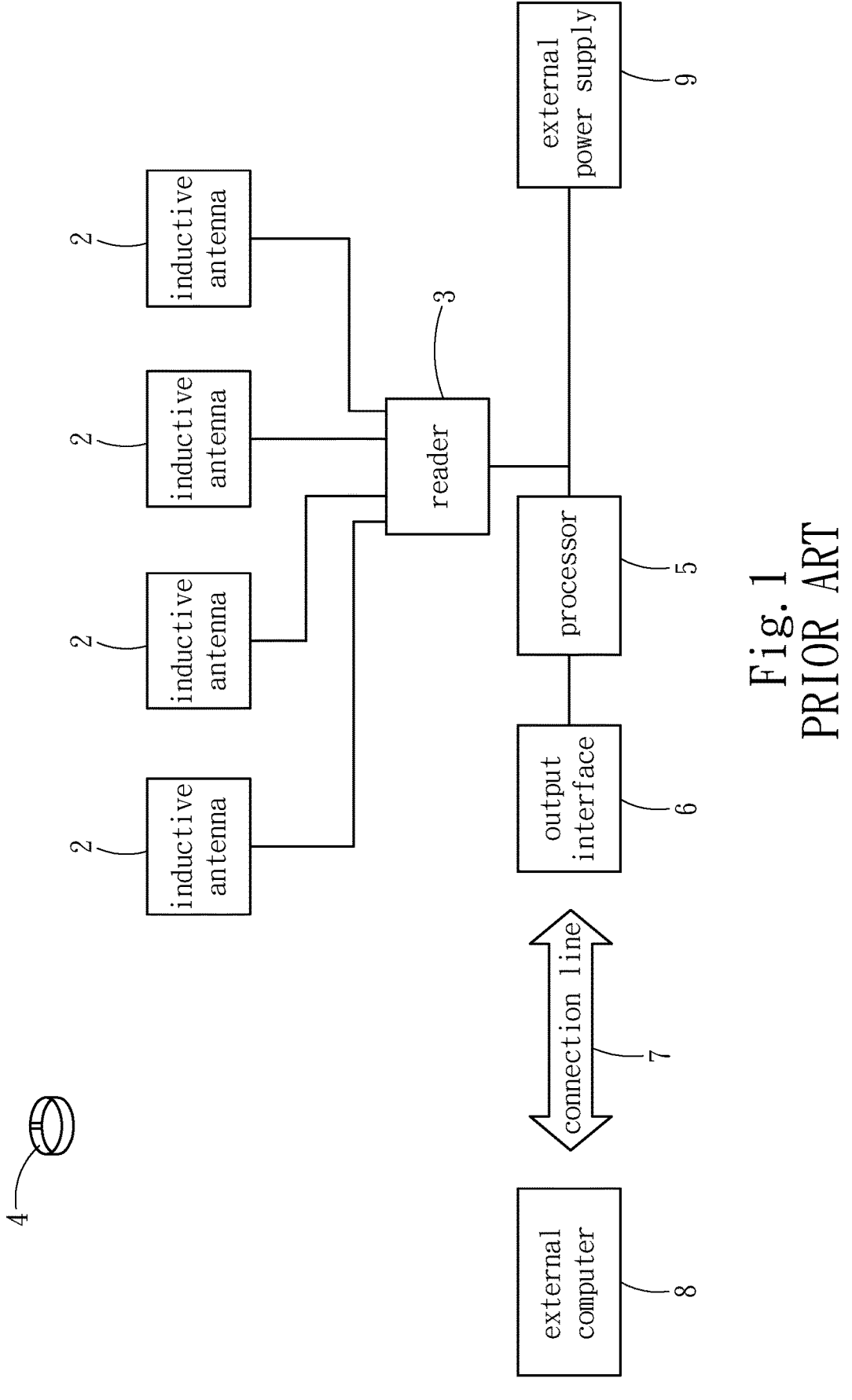
FIG. 1 is an architecture diagram of a conventional system.
Figure 2:
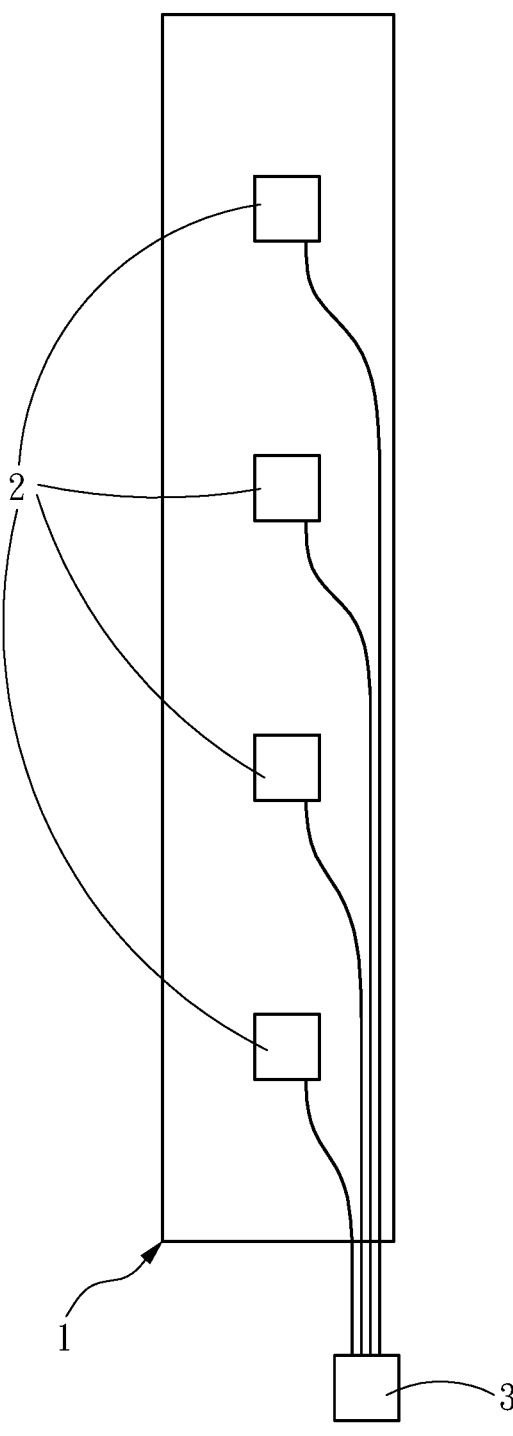
FIG. 2 is a schematic diagram of wiring of a conventional floor mat antenna.
Figure 3:
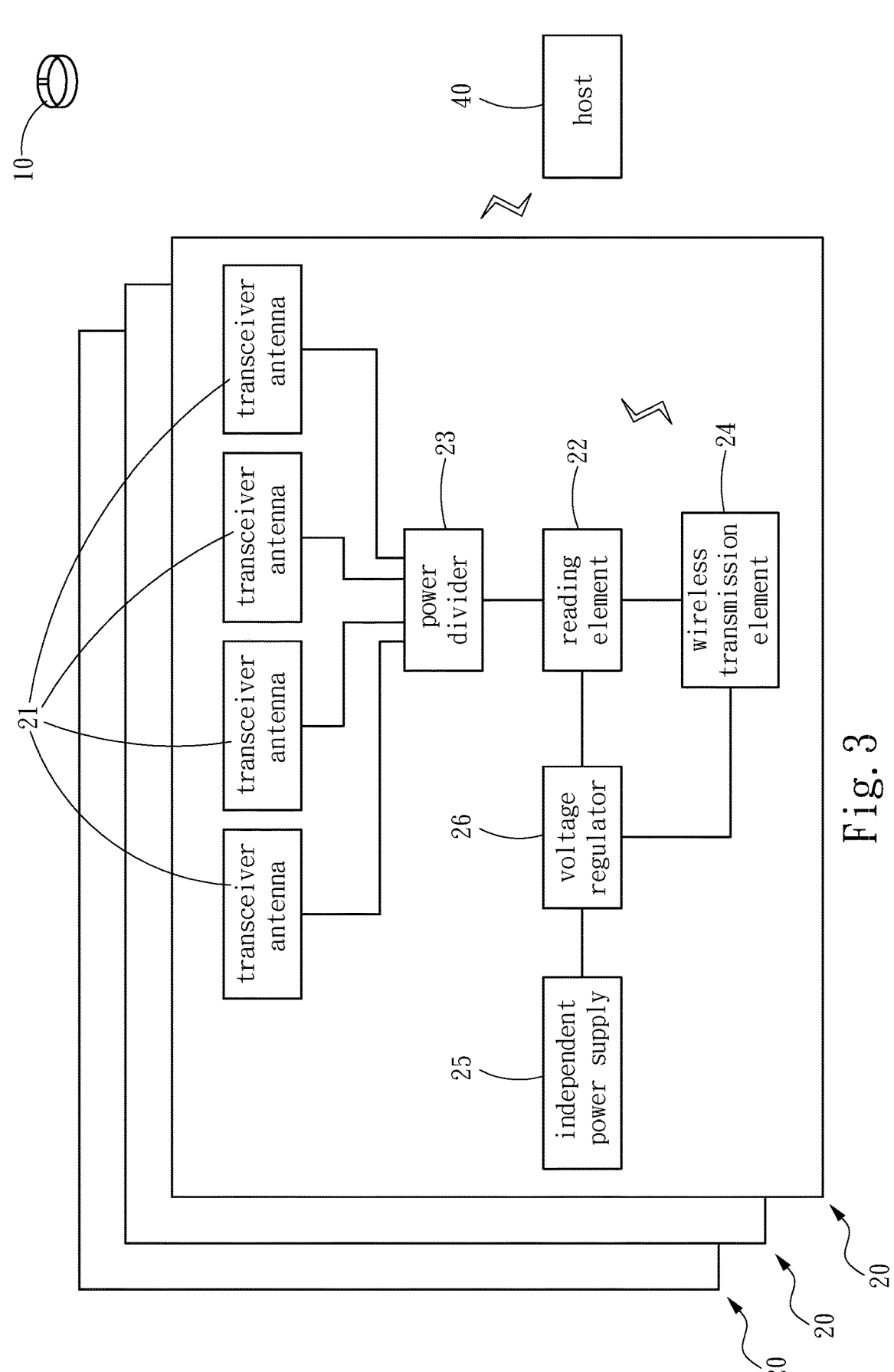
FIG. 3 is an architecture diagram of a system of the invention.
Figure 4:
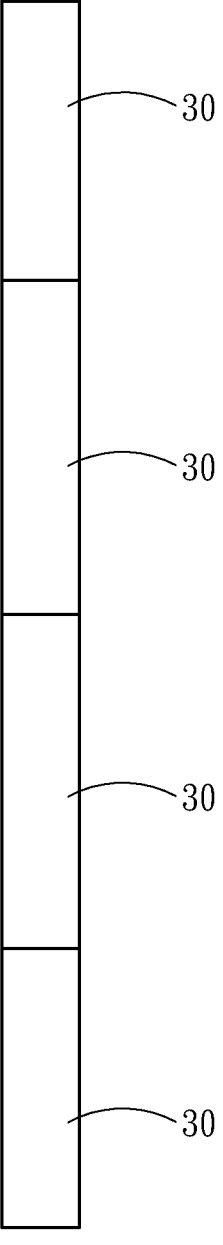
FIG. 4 is a schematic diagram of splicing of floor mats of the invention.

Please refer to FIG. 3 and FIG. 4. The invention discloses an inductive floor mat recording system for reading an RFID tag 10, comprising at least one RFID transceiver device 20, a plurality of floor mats 30 and a host 40, wherein the at least one RFID transceiver device 20 includes at least two transceiver antennas 21, a reading element 22, a power divider 23 and a wireless transmission element 24. The at least two transceiver antennas 21 are provided for sensing the RFID tag 10, and the at least two transceiver antennas 21 can be circularly polarized antennas to minimize dead spots of sensing.

The reading element 22 is provided for reading the RFID tag 10. The reading element 22 is electrically connected to the power divider 23 and the wireless transmission element 24. The power divider 23 is electrically connected in parallel to the at least two transceiver antennas 21, and the reading element 22 simultaneously uses the at least two transceiver antennas 21 for reading through the power divider 23. Accordingly, the reading element 22 of the invention is capable of simultaneously using the at least two transceiver antennas 21 for reading, so there is no reading gap problem.

Figure 5:
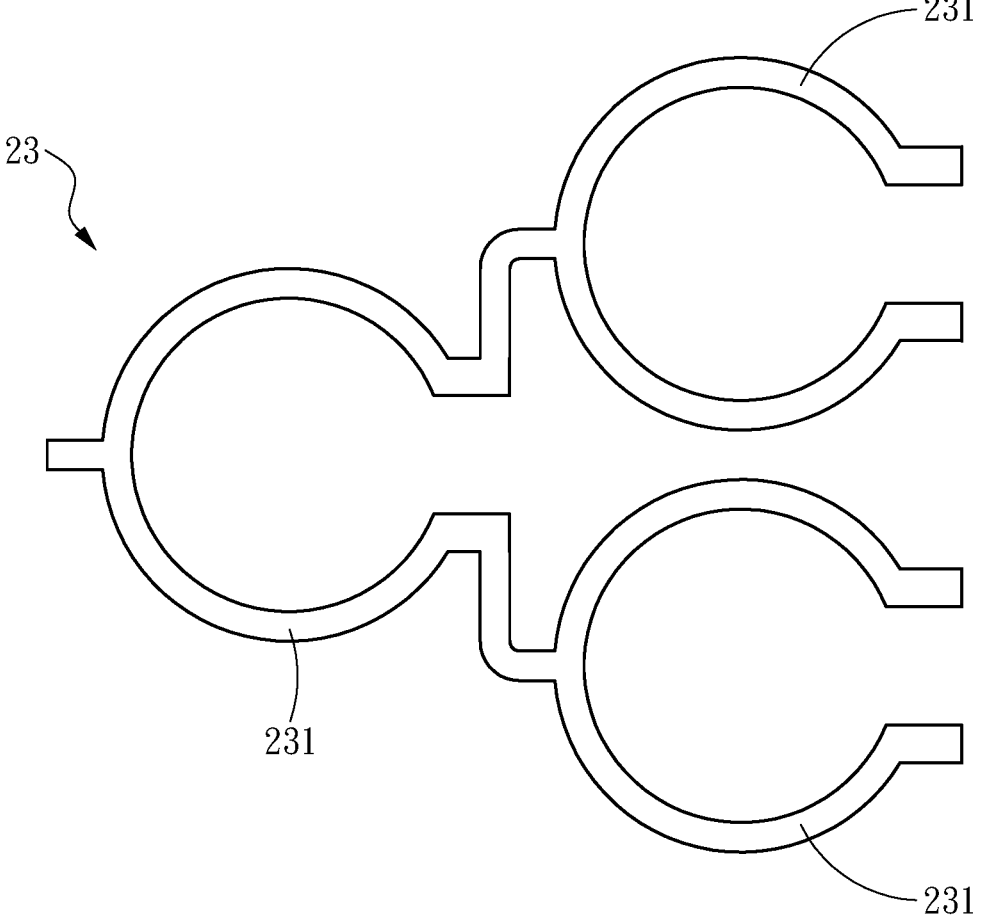
FIG. 5 is a schematic structural diagram of a power divider of the invention.

Please refer to FIG. 5 shows the power divider 23 used in the invention, in which three 1-to-2 dividers 231 are connected in series in a 2-to-1 manner to form a 1-to-4 type, and provided for connecting four transceiver antennas 21 in parallel as shown in FIG. 3. In addition, the at least one RFID transceiver device 20 is wirelessly connected to the host 40 through the wireless transmission element 24 to obtain data of the RFID tag 10 read by the reading element 22 by the host 40. In one embodiment, the wireless transmission element 24 is an ESP32 microcontroller, a commercial product that is commercially available and widely used and capable of providing standardized data processing capabilities, Wi-Fi and Bluetooth wireless communication functions.

Figure 6:
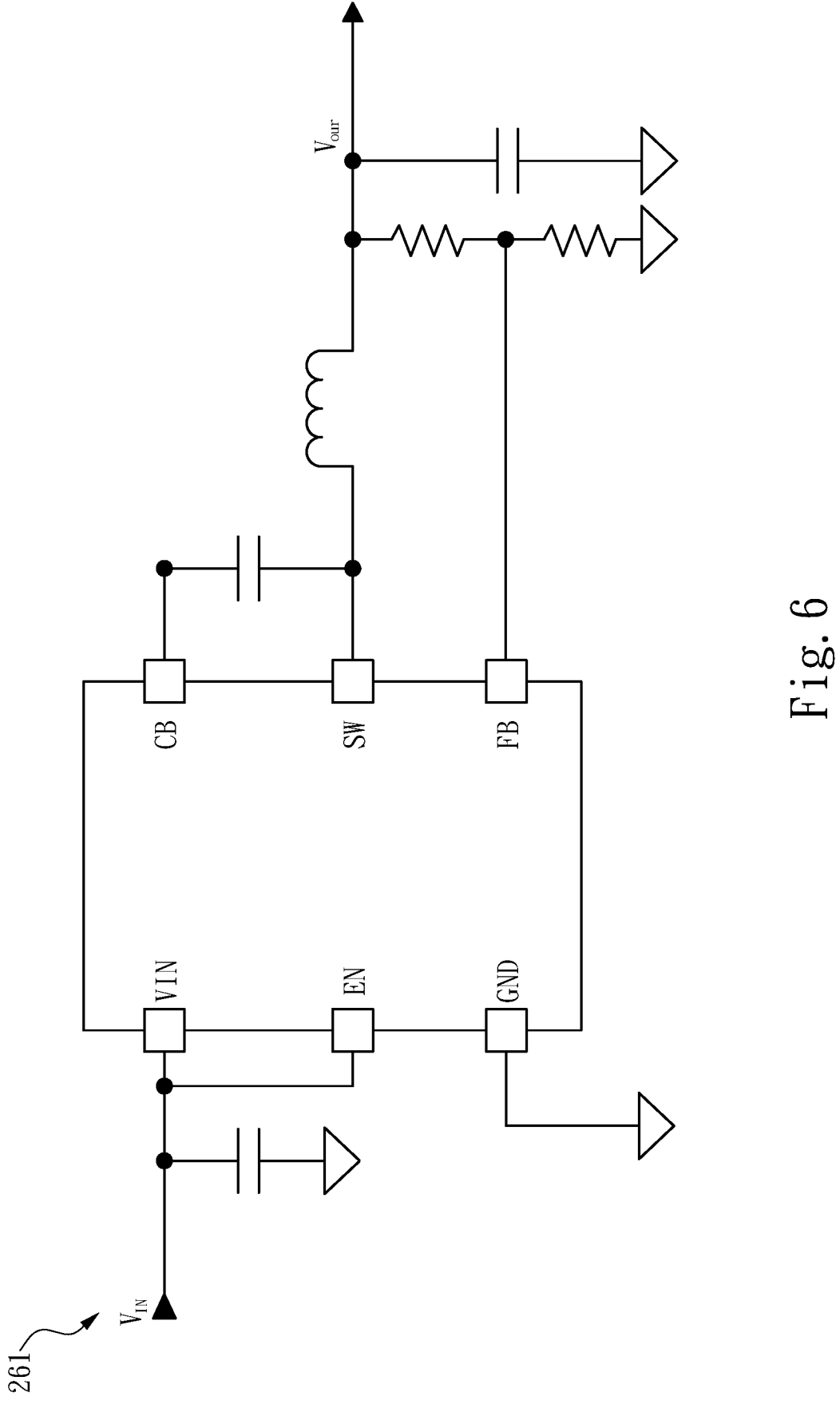
FIG. 6 is a schematic diagram of circuit structure of a voltage regulator of the invention.

Please refer to FIG. 3 and FIG. 6. The at least one RFID transceiver device 20 is further provided with an independent power supply 25 supplying electric power required by the reading element 22. Preferably, the independent power supply 25 is a rechargeable battery. In one embodiment, the independent power supply 25 is an 18650 battery array. In order to meet voltage requirements for the reading element 22 to read, the at least one RFID transceiver device 20 further comprises a voltage regulator 26. The reading element 22 is connected to the independent power supply 25 through the voltage regulator 26. In one embodiment, the voltage regulator 26 adopts a voltage-stabilizing LDO (Low Dropout Regulator) and a DC-DC converter 261 (as shown in FIG. 6) simultaneously to meet high-quality voltage requirements, wherein the DC-DC converter 261 can use a commercially available voltage regulator LMR5143 to achieve high-efficiency power conversion.

As shown in FIG. 4, the plurality of floor mats 30 are spliced together to form a long strip to serve as a finish line of large-scale competition events such as road running and cycling. Please refer to FIG. 3, each of the plurality of floor mats 30 is provided with at least one transceiver antenna 21. The reading element 22, the power divider 23, and the wireless transmission element 24 in one RFID transceiver device 20 are together disposed on one floor mat 30. Preferably, the reading element 22, the power divider 23 and the wireless transmission element 24 are embedded in the plurality of floor mat 30.

In addition, manners in which the at least one RFID transceiver device 20 disposed on each of the plurality of floor mats 30 are mainly described in a first embodiment and a second embodiment below.

Figure 7:
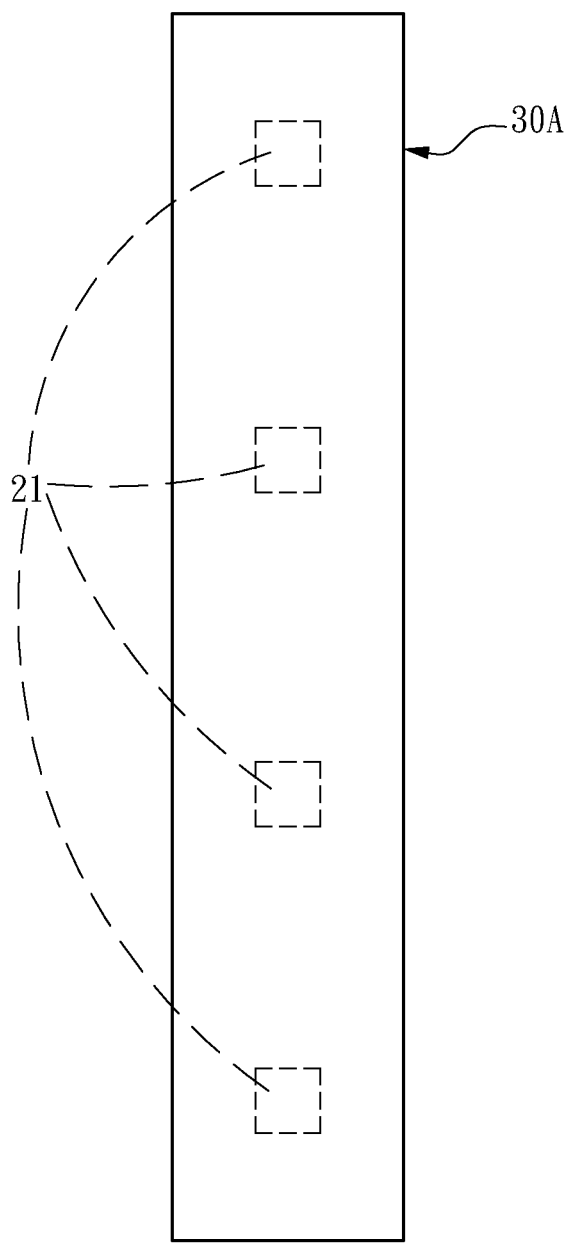
FIG. 7 is a schematic diagram of a first embodiment of the invention.

Please refer to FIG. 3, and FIG. 7 for the first embodiment of the invention. In this embodiment, a floor mat 30A is a type with a longer length, and transceiver antennas 21 in the one RFID transceiver device 20 are disposed on the floor mat 30A at intervals. As shown in FIG. 7, four transceiver antennas 21 are provided and disposed on the floor mat 30A.

Figure 8:
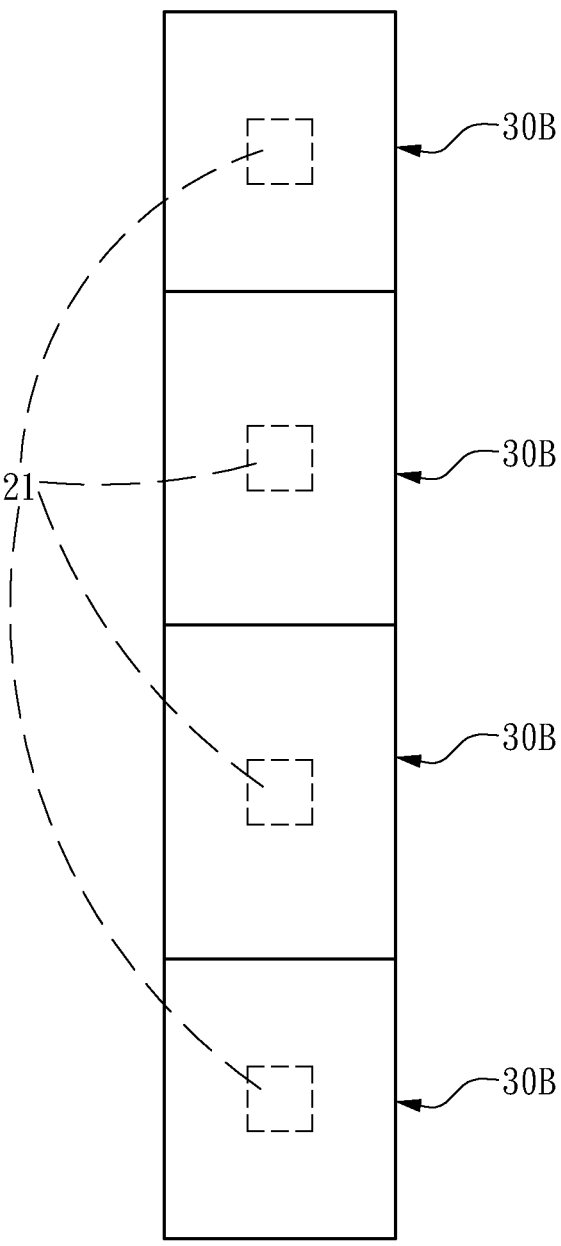
FIG. 8 is a schematic diagram of a second embodiment of the invention.

Please refer to FIG. 8 for the second embodiment of the invention. In this embodiment, four floor mats 30B are a type with a shorter length. Since a length of the floor mat 30B is shorter, the four floor mats 30B are spliced together to form a long strip, each of the four floor mats 30B is provided with a transceiver antenna 21, and four transceiver antennas 21 are electrically connected in parallel to the power divider 23 (as shown in FIG. 3).

As mentioned above, characteristics of the invention at least include:
1. The reading element is electrically connected in parallel with the at least two transceiver antennas through the power divider, the reading element is capable of simultaneously using the at least two transceiver antennas for reading. The reading element has no reading gap, and thus a problem of missed reading would not be occurred.
2. With independent power supply design and wireless communication with an external host, and problems of power supply and wiring configuration can be avoided. When the floor mats need to be spliced, requirements of setup time and manpower can be greatly reduced.
3. The voltage regulator adopts both a voltage-stabilizing LDO (Low Dropout Regulator) and a DC-DC converter to provide a high-quality voltage supply.
4. The reading element is capable of simultaneously using the at least two transceiver antennas for reading, and the at least two transceiver antennas can be circularly polarized antennas capable of minimizing dead spots of sensing to ensure that the RFID tag is read, so the invention is suitable for applying in sports of quickly passing a finish line, such as cycling.

What is claimed is:
1. An inductive floor mat recording system for reading a fast-moving RFID (radio-frequency identification) tag, comprising:
   at least one RFID transceiver device, each of the at least one RFID transceiver device comprising at least two transceiver antennas sensing the RFID tag, a reading element reading the RFID tag, a power divider, and a wireless transmission element, the reading element electrically connected to the power divider and the wireless transmission element, at least two output terminals of the power divider directly electrically connected in parallel to the at least two transceiver antennas for sensing the RFID tag, respectively, and the reading element being configured to read the RFID tag without a reading cycle gap in cyclic scanning by receiving data from the at least two transceiver antennas through the power divider;
   a plurality of floor mats spliced together, each of the plurality of floor mats provided with at least one transceiver antenna, and the reading element, the power divider and the wireless transmission element in one of the at least one RFID transceiver device disposed on one of the plurality of floor mats; and
   a host, wirelessly connected to the at least one RFID transceiver device through the wireless transmission element to obtain data of the RFID tag read by the reading element,
   wherein the at least two transceiver antennas are circularly polarized antennas to minimize the dead spots of sensing.
2. The inductive floor mat recording system as claimed in claim 1, wherein the at least two transceiver antennas in one RFID transceiver device are disposed on one floor mat at intervals.
3. The inductive floor mat recording system as claimed in claim 1, wherein each of the plurality of floor mats is provided with one transceiver antenna.
4. The inductive floor mat recording system as claimed in claim 1, wherein each of the at least one RFID transceiver device is further provided with an independent power supply supplying electric power required by the reading element.

5. The inductive floor mat recording system as claimed in claim 4, wherein the independent power supply is a rechargeable battery.

6. The inductive floor mat recording system as claimed in claim 5, wherein the independent power supply is an 18650 battery array.

7. The inductive floor mat recording system as claimed in claim 4, wherein the at least one RFID transceiver device further comprises a voltage regulator, and the reading element is connected to the independent power supply through the voltage regulator.

8. The inductive floor mat recording system as claimed in claim 1, wherein the wireless transmission element is an ESP32 (Espressif 32) microcontroller.

\* \* \* \* \*